United States Patent [19]

Yamashita et al.

[11] Patent Number: 5,003,474
[45] Date of Patent: Mar. 26, 1991

[54] METHOD AND APPARATUS FOR PERFORMING ADDRESS TRANSFORMATION OF PROJECTION DATA FOR USE IN POSITRON COMPUTED TOMOGRAPHY SYSTEM

[75] Inventors: Takaji Yamashita; Keiji Shimizu, both of Shizuoka, Japan

[73] Assignee: Hamamatsu Photonics Kabushiki Kaisha, Shizuoka, Japan

[21] Appl. No.: 341,172

[22] Filed: Apr. 21, 1989

[30] Foreign Application Priority Data

Oct. 22, 1987 [JP] Japan .................. 62-267899

[51] Int. Cl.$^5$ ............................. G01T 1/161
[52] U.S. Cl. ..................... 364/413.13; 250/363.03
[58] Field of Search ............ 364/413.13; 250/363.03

[56] References Cited

PUBLICATIONS

Cahoon, J. L. et al., "The Electronics for Donner 600-–Crystal Positron Tomograph", IEEE Transactions on Nuclear Science, vol. 33, No. 1, Feb. 1986, 570–575.

*Primary Examiner*—Clark A. Jablon

*Attorney, Agent, or Firm*—Finnegan, Henderson, Farabow, Garrett and Dunner

[57] ABSTRACT

A method and an apparatus for performing address transformation of projection data for use in a positron CT system, where plural detectors are classified into plural detector groups. In this system, a polar coordinate of the addresses assigned to paired detectors which detect coincident events of gamma-ray emission is determined by adding a first encoded signal representing a first polar coordinate of the line joining the reference points of the paired detector groups including the paired detectors and a second encoded signal representing a second polar coordinate of the deviation of the line joining the two detectors from the line joining the reference points. The second encoded signal is obtained on the basis of address signals representing the addresses of the two detectors and a third encoded signal representing the angle relationship of the paired detector groups which is preliminarily stored in a memory. The polar coordinate thus obtained is outputted as a fourth encoded signal and used in a image reconstruction process of the positron CT system.

9 Claims, 4 Drawing Sheets

METHOD AND APPARATUS FOR PERFORMING ADDRESS TRANSFORMATION OF PROJECTION DATA FOR USE IN POSITRON COMPUTED TOMOGRAPHY SYSTEM

BACKGROUND OF THE INVENTION

The present invention relates to a method and apparatus for performing address transformation of projection data for use in a positron computed tomographic system and more particularly, to a method and apparatus for performing address transformation of the projection data for use in a positron CT system using the addresses of a pair of detector groups including two detectors that have detected coincidently gamma-rays, and the addresses of these detectors in their respective groups.

The recent advances in a CT system have been remarkable, and X-ray and ultrasonic CT systems and other similar systems are being used with great advantage in hospitals and research laboratories for various purposes including diagnosis of diseases and examination of organs and tissues in the living body. Among the CT systems available today, positron CT systems are being studied most extensively and hold much promise for future applications.

A positron CT system comprises a plurality of detectors that are arrayed in an annular or polygonal form around the patient. When a tracer radionuclide (i.e. isotope) is injected into the body of the patient, the isotope emits a positron upon disintegration, which binds almost instantly with an electron in the body, resulting through pair annihilation in the simultaneous emission of two gamma-rays moving in nearly opposite directions. When a pair of detectors recognizes coincident events of gamma-ray emission, that is, detects coincidentally the gamma-rays, the point of isotope disintegration is determined to lie on a line joining the two detectors. In this case, each of the addresses assigned to the two detectors is transformed in an address transforming circuit to projection data address (T, $\theta$), which is used in image reconstruction process, and then stored in the memory or disk of a computer.

The projection data addresses will be explained hereinafter with reference to FIG. 1.

As shown in FIG. 1, gamma-ray detectors $D_{i-1}$, $D_{i-2}$, $D_{i-3}$, ... $D_{j-1}$, $D_{j-2}$, $D_{j-3}$, ... are arranged, for example, in an annular form. Assuming that $\theta$ is the angle of inclination of the line which passes the center 0 of the ring and vertically intersects the line joining two detectors ($D_{i-2}$ and $D_{j-2}$ in FIG. 1) and T is the length of the perpendicular (i.e., the distance between the center 0 and the line joining $D_{i-2}$ and $D_{j-2}$), the addresses (#i, #j) assigned to the paired detectors are transformed to the corresponding polar coordinates (T, $\theta$), and the addresses thus obtained are used as projection data addresses in the image reconstruction process.

As shown in FIG. 2, the detectors are usually classified into a plurality of groups (G1, G2..., G$\phi$) each of which includes N detectors, and each pair of detectors is assigned two types of addresses, one of which is the address ($G_i$, $G_j$) of the group including each of the paired detectors and the other of which is the address (Xi, Xj) of a detector defined in a group. That is, an absolute address (#i, #j) of the paired detectors can be represented by the two types of the addresses ($G_i$, $G_j$) and ($X_i$, $X_j$). Detection of coincident events of gamma ray emission is also performed between detector groups. When detection of the coincident events is accomplished with two detectors that is, the gamma-rays has been coincidentally detected by the paired detectors, the addresses ($G_i$, $G_j$) of the groups including the paired detectors and the addresses ($X_i$, $X_j$) of the paired detectors defined in the respective groups are supplied into an address transforming circuit, where they are transformed to projection data addresses (T, $\theta$). To this end, a look-up table representing the relationship between detector addresses ($G_i$, $G_j$, $X_i$, $X_j$) and (T, $\theta$) addresses is preliminarily stored in a semiconductor memory ROM or RAM and transformation is performed by use of this table.

A prior art address transforming circuit as shown in FIG. 6 consists basically of a memory 1' for storing a value corresponding to T (the length of the line which passes the center 0 and vertically intersects the line joining paired detectors) and a memory 2' for storing a value corresponding to the angle $\theta$ of inclination of the normal line with respect to a predetermined line (e.g., a dotted line as shown in FIG. 1). Signals representing the addresses ($G_i$, $G_j$) of the groups to which paired detectors belong and the addresses ($X_i$, $X_j$) of the detectors defined in the respective groups are inputted through input lines to the memories and the corresponding (T, $\theta$) addresses are outputted.

The prior art address transforming circuit, however, has a serious drawback in that the number of addresses that can be received by IC memories is limited; for example, a commonly employed 256 kb ROM can receive only 15 bits (over 15 input lines) and output 8 bits (over 8 output lines). In other words, if many detectors are used in the prior art method, all inputs of ($G_i$, $G_j$, $X_i$ and $X_j$) cannot be received by a single IC memory and therefore additional memories must be connected in parallel in order to absorb the extra number of bits in ($G_i + G_j + X_i + X_j$) which can not be received by a single memory. If a 256 kb ROM is used for signals representing $G_i$ and $G_j$ each compound of 4 bits and $X_i$ and $X_j$ each composed of 6 bits, 32 IC memories are necessary since $2(4+4+6+6)-15=32$. Accordingly, the prior art address transforming circuit causes a high cost product.

SUMMARY OF THE INVENTION

An object of the present invention is to solve the aforementioned problems of the prior art address transforming circuit by providing a method of performing address transformation of projection data for use in a positron CT system that is capable of address transformation with a smaller number of IC memories even if a large number of detectors are used in the CT system.

Another object of the present invention is to provide an apparatus for implementing this method.

In the method and apparatus of the present invention for performing transformation to projection data addresses on a positron CT system, there are provided a plurality of detector groups including a plurality of detectors; encoding means which performs transformation to polar coordinates of the line joining the reference points of a pair of detector groups that include two detectors which detect coincident events of gamma-ray emission, the transformation to polar coordinates being performed based on the addresses of the pair of detector groups; means for outputting an encoded signal associated with the angle relationship of the pair of detector groups; means by which encoded signals representing the deviation from said polar coordinates are produced based on the detector address signals for the individual members of the pair of detector groups and on the encoded signal representing the angle relationship of the pair of detector groups; and adder means for combining the encoded signals for polar coordinates and the encoded signals representing the deviation from the polar coordinates.

DETAILED DESCRIPTION OF THE INVENTION

According to the method and apparatus of this invention, the addresses assigned to a pair of detector groups including two detectors which detect coincident events of gamma-ray emission are transformed to a polar coordinate ($T_0$, $\theta_0$) of the line joining the respective reference points of the detector groups. Thereafter, the polar coordinate is outputted as an encoded signal and at the same time an encoded signal representing the relationship of the pair of detector groups is outputted. On the basis of the signals representing the addresses of the paired detectors defined in each of the paired detector groups and the encoded signal representing the relationship of the paired detector groups, an encoded signal ($\Delta T$, $\Delta \theta$) representing the deviation from the reference polar coordinate ($T_0$, $\theta_0$) are obtained and outputted. The deviation signal thus obtained is added to the encoded signal ($T_0$, $\theta_0$) to obtain a signal ($T_0 + \Delta T$, $\theta_0 + \Delta \theta$) which serves as an encoded signal for the polar coordinate ($T$, $\theta$) of the line joining the paired detectors of interest, thus performing address transformation of projection data address for the image reconstruction in the positron CT system.

Preferred embodiments of the present invention will be described hereinafter with reference to the accompanying drawings.

Figure 1:
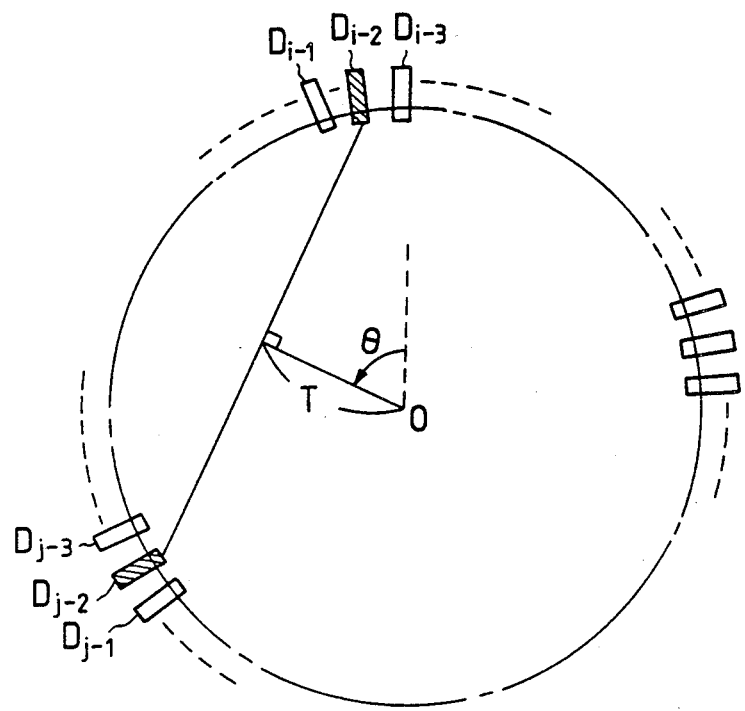
FIG. 1 is a diagram illustrating projection data addresses obtained in a positron CT system.
Figure 2:
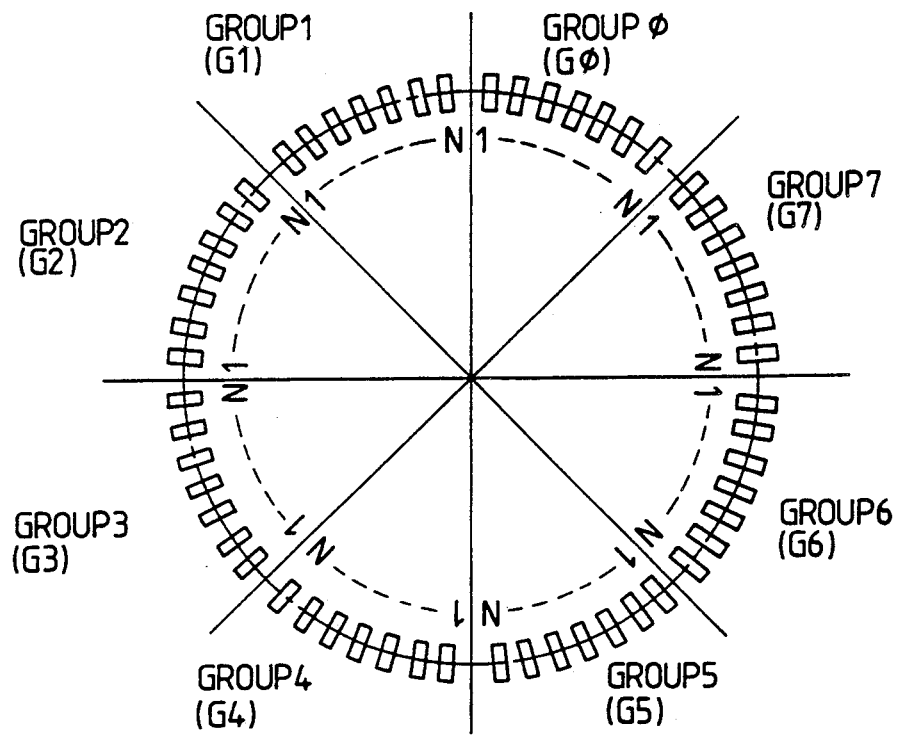
FIG. 2 is a schematic diagram of the layout of detectors, which also shows how they are classified into groups.

The positron CT system to which the projection data address transforming method and apparatus of the present invention is applied has the same detector arrangement as shown in FIG. 1 and the detectors are classified into plural groups as shown in FIG. 2.

Figure 5A:
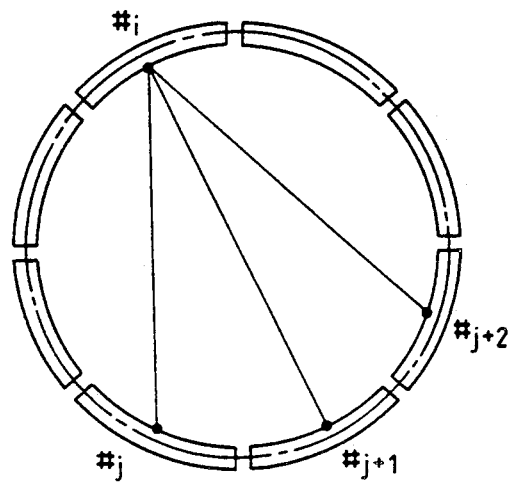
FIGS. 5A and 5B are diagrams showing the relationship of detector groups in two cases.

Detection of coincident events of the gamma-ray emission is practically performed between a certain detector group and plural detector groups (N groups) facing the detector group as shown in FIG. 5A, that is, N pairs of detector groups are assigned to each detector group. FIG. 5A shows a case where N is 3, but it should be understood that cases where N is greater or smaller than 3 are also included within the scope of the present invention.

Figure 5B:
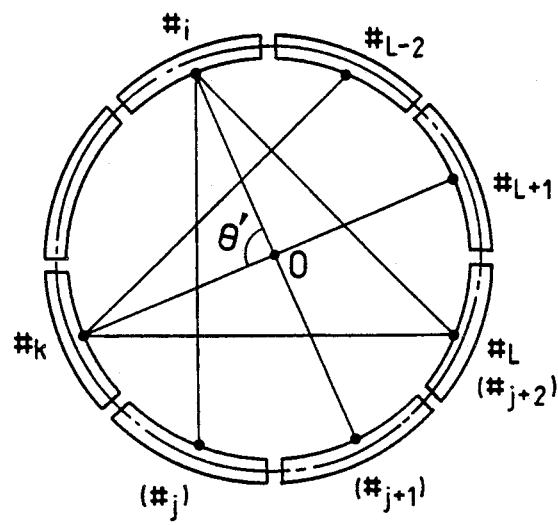
Figure 6:
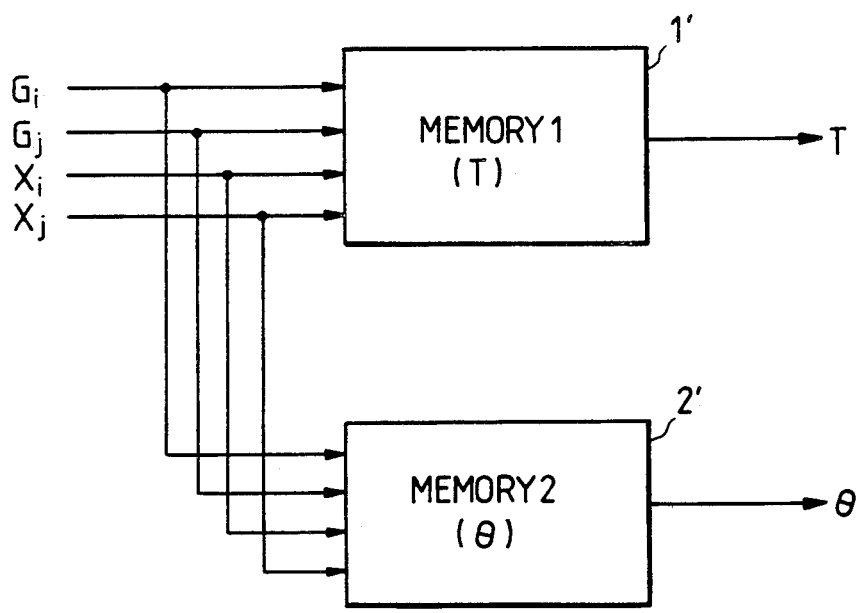
FIG. 6 is a circuit diagram for performing address transformation of projection data of a prior art method.

The N pairs of detector groups for each group detector have respective inherent angle informations, for example, oblique angles of lines joining respective pairs with respect to a predetermined line, and therefore the assembly of the N pairs assigned to each detector group have N types of angle informations. As is apparent from FIGS. 5A and 5B, the relative angle relationship comprising N types of angle informations for each detector group will coincide with that for another detector group if the detectors are rotated by an angle $\theta'$ and superposed one on another. In other words, the angle relationship of groups $\#_j$, $\#_{j+1}$ and $\#_{j+2}$ with respect to group $\#_i$ is the same as that of groups $\#_L$, $\#_{L+1}$ and $\#_{L+2}$ with respect to group $\#_k$. Therefore, if an arbitrary pair of detector groups which have detected incident events of the gamma-ray emission is determined, the corresponding relative angle relationship of the pairs is determined by selecting one of N types of angle information. According, if the amount by which the line joining the paired detectors in any paired detector groups designated by the selected angle relationship is deviated from the projection address $T_0$, $\theta_0$) of the line joining the reference points of those detector groups is preliminarily stored in a look-up table in a memory, the deviation from the reference address ($T_0$, $\theta_0$) can be determined from both the selected angle relationship between detector groups and the detector addresses. In addition, the angle relationship of each of paired detector groups consists of N types and is the same for all detector groups, so that the capacity of a memory used for discriminating one type of relationship from another can be reduced. The polar coordinates of deviation which are determined on the basis of the addresses of the individual detectors in detector groups and one of N types of angle relationship are also determined uniquely for all the paired detector groups by use of the above method, and hence the capacity of a table memory representing that relationship can also be reduced.

The principle and the apparatus of the present invention will be described in detail with reference to FIGS. 3 and 4.

Figure 3:
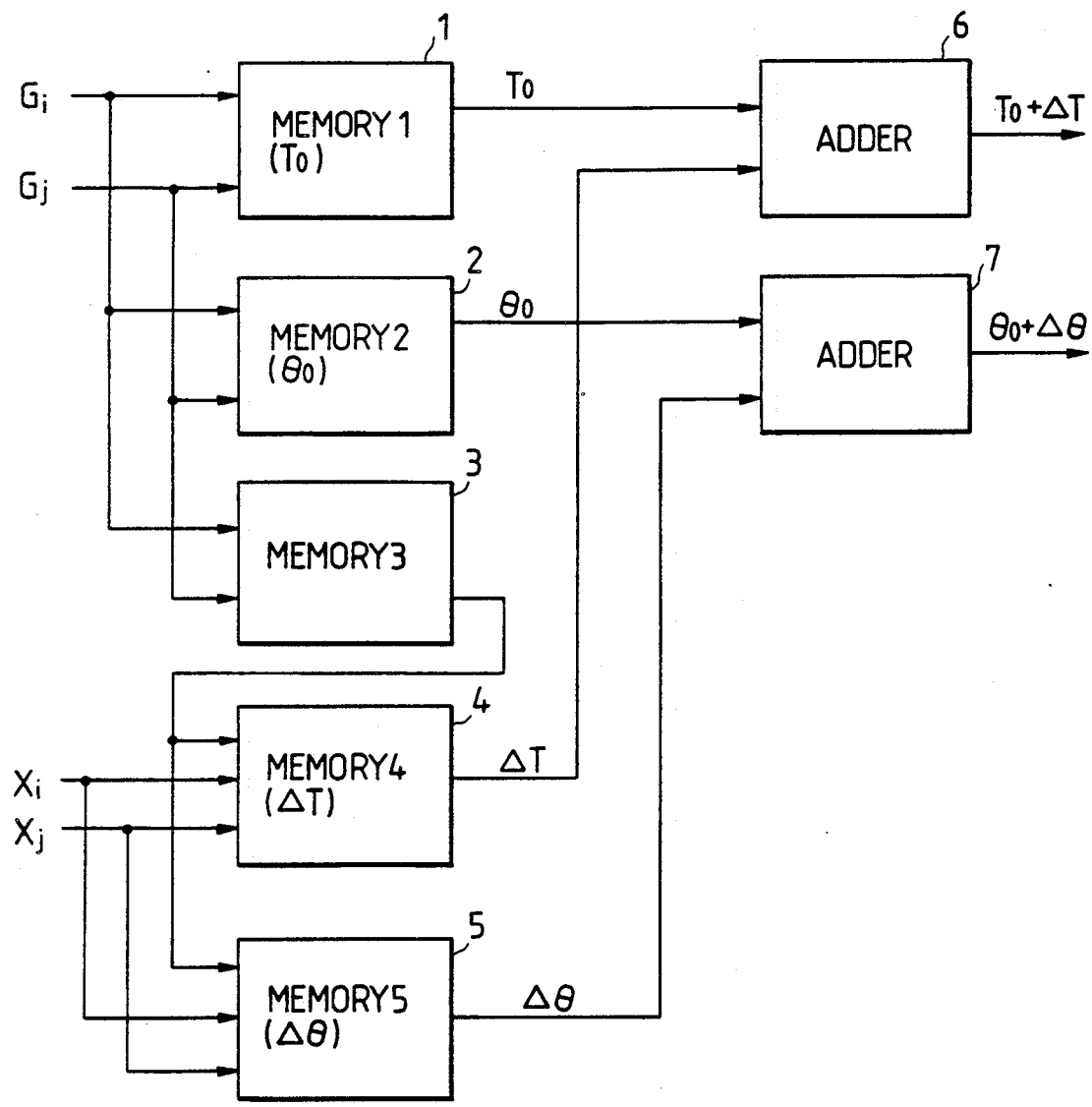
FIG. 3 is a circuit diagram for performing address transformation of projection data in accordance with the present invention.
Figure 4:
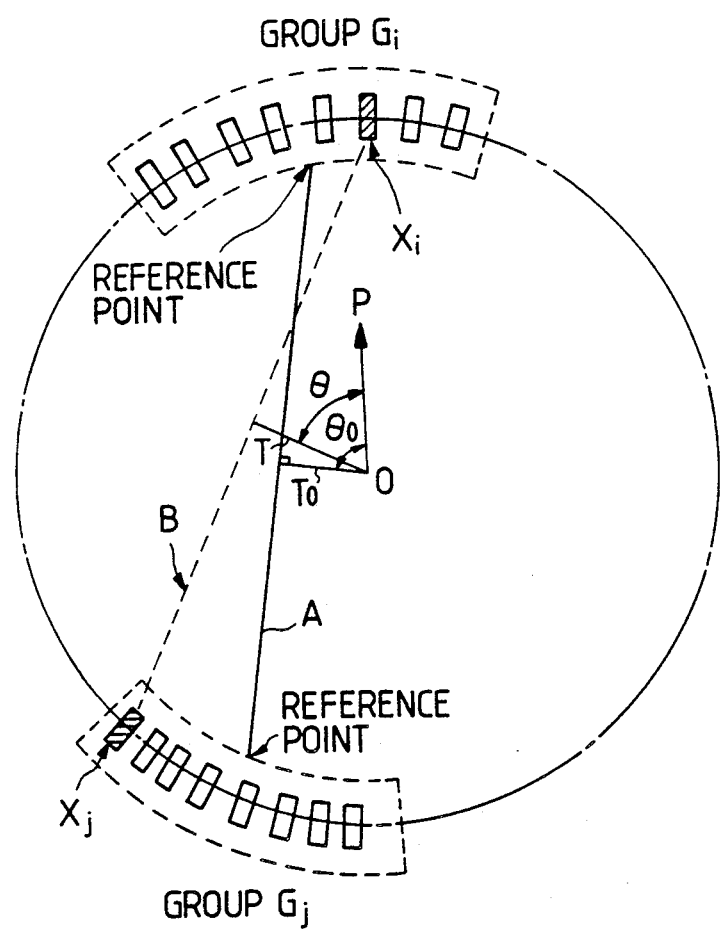
FIG. 4 is a diagram showing the operating principle of the circuit shown in FIG. 3.

FIG. 3 is a schematic diagram of the projection data address transforming apparatus of the present invention, and FIG. 4 is a diagram for the principle of determining a polar coordinate of the line joining two detectors that have detected coincident events of gamma-ray emission. In FIG. 3, reference numeral 1 is a memory for outputting $T_0$ (the length of the line which passes the ring center 0 and vertically intersects to the line joining the reference points of the pair of detector groups including the above two detectors, and 2 is a memory for outputting $\theta_0$ (the angle of inclination of the perpendicular with respect to a predetermined line as indicated by the arrow op). In response to input signals, that is, address signals $G_i$ and $G_j$ for the detector groups including the two detectors that have detected coincident events of gamma-ray emission, memories 1 and 2 output corresponding signals $T_0$ and $\theta_0$ by looking up the preliminarily stored tables. Reference numeral 3 is a memory which discriminates between the N types of the angle relationship of the paired detector groups. Memories 4 and 5 are IC memories that are respectively supplied with address signals $X_i$ and $X_j$ for the two detectors that have detected coincident events of gamma-ray emission and which respectively output $\Delta T$ and $\Delta \theta$. The combination of $\Delta T$ and $\Delta \theta$ represents the amount by which the line joining the two detectors is deviated from the line joining the reference points of the associated detector groups. Reference numerals 6 and 7 are signal address for adding $\Delta T$ and $\Delta \theta$ to $T_0$ and $\theta_0$, respectively.

Assuming that the detector groups including the two detectors that have detected coincident events of gamma-ray emission have address signals $G_i$ and $G_j$, and also that the respective detectors have address signals $X_i$ and $X_j$, each of the address signals $G_i$ and $G_j$ is supplied into IC memories 1 and 2 and discriminating memory 3 while each of the address signals $X_i$ and $X_j$ is supplied into IC memories 4 and 5. The memories 1 and 2 output polar coordinate addresses $T_0$ and $\theta_0$ with respect to the center 0 of the ring in a positron CT system and the line joining the reference points (e.g. the centers) of detector groups having group addresses $G_i$ and $G_j$ by looking up the tables stored in those memories, respectively. This is illustrated in FIG. 4 by the relationship between solid line A and center point 0. The IC memory 3 outputs a code signal that discriminates between the N types of angle relationship of the paired detectors in the two detector groups. The output of memory 3 is supplied into each of IC memories 4 and 5 together with addresses $X_i$ and $X_j$ of the paired detectors. The memories 4 and 5 output code signals for $\Delta T$ and $\Delta \theta$, respectively, on the basis of the discriminating code from the memory 3 and the detector addresses $X_i$ and $X_j$ by looking up the internal tables where $\Delta T$ and $\Delta \theta$ represent the deviation in distance and angle of dashed line B from solid line A. Subsequently, the output $T_0$ of the memory 1 and the output $\Delta T$ of the memory 4 are supplied into the adder 6 to be added to each other, while the output $\theta_0$ of the memory 2 and the output $\Delta \theta$ of the memory 5 are supplied into the adder 7 to be added to each other. The output $(T_0 + \Delta T)$ from the adder 6 and the output $(\theta_0 + \Delta \theta)$ from the adder 7 correspond to the projection data addresses of the line (i.e., dashed line B in FIG. 4) joining the two detectors that have detected coincident events of gamma-ray emission In other words, $T = T_0 + \Delta T$ and $\theta = \theta_0 + \Delta \theta$ which are the polar coordinate of dashed line B with respect to the ring center 0 are computed to output an associated code signal, thereby performing address transformation of the desired projection data.

In the embodiment described above, IC memory 3 is provided separately from IC memories 1 and 2, but it should be understood that this memory may be an integral part of memories 1 and 2. In another modification, each of the address 6 and 7 may be in the form of a look-up table in an IC memory.

As described above, the method and appartus of this invention offer the advantage that even if a large number of detectors are to be used, a comparatively few IC memories suffice for constructing an address transforming circuit. In other words, simplification of circuit configuration and cost reduction are two major advantages of the present invention.

What is claimed is:

1. A method for performing address transformation of projection data for use in a positron CT system, comprising the steps of:
    on the basis of the addresses assigned to paired detector including two detectors which detect coincident events of gamma-ray emission, determining a first polar coordinate of the line joining the reference points of said paired detector groups and outputting a first encoded signal representing said first polar coordinate;
    outputting a second encoded signal representing the angle relationship of said paired detector groups;
    on the basis of address signals representing the addresses of said two detectors and said second encoded signal, obtaining a third encoded signal representing a second polar coordinate of the deviation of the line joining said two detectors from the line joining said reference points; and
    adding said third encoded signal to said first encoded signal to produce a fourth encoded signal representing a third polar coordinate of the line joining said two detectors.

2. A method as claimed in claim 1, said method further comprising the step of: preliminarily storing angle relationship of a predetermined number of paired detector groups in a memory.

3. A method as claimed in claim 2, wherein said angle relationship comprises information on relative angles of said predetermined number of paired detector groups.

4. A method as claimed in claim 1, wherein said reference points of paired detector groups are set to the centers thereof, respectively.

5. A method as claimed in claim 1, said method further comprising the step of using said fourth encoded signal in an image reconstruction process of the positron CT system.

6. An apparatus for performing address transformation of projection data for use in a positron CT system, comprising:
    plural detectors classified into plural detector groups;
    first means for obtaining a first polar coordinate of the line joining the reference points of paired detector groups including two detectors which detect coincident events of gamma-ray emission, on the basis of the addresses assigned to said paired detector groups, and outputting a first encoded signal representing said first polar coordinate;
    second means for outputting a second encoded signal representing the angle relationship of said paired detector groups;
    third means for producing a third encoded signal representing a second polar coordinate of the deviation of the line joining said two detectors from the line joining said paired detector groups on the basis of the address signals representing the addresses of said two detectors and said second encoded signal; and
    adder means for adding said first encoded signal to said third encoded signal 7. An apparatus as claimed in claim 6, wherein the whole angle relationship of a predetermined number of paired detector groups are preliminarily stored in said second means.

8. An apparatus as claimed in claim 7, wherein said angle relationship comprises information on relative angles of said predetermined number of paired detector groups.

9. An apparatus as claimed in claim 6, wherein said reference pints of paired detector groups are set to the centers thereof, respectively.

* * * * *

UNITED STATES PATENT AND TRADEMARK OFFICE
CERTIFICATE OF CORRECTION

PATENT NO. : 5,003,474

DATED : March 26, 1991

INVENTOR(S) : Takaji Yamashita et al.

It is certified that error appears in the above-identified patent and that said Letters Patent is hereby corrected as shown below:

Claim 9, Column 6, Line 61, change "pints" to --points--.

Signed and Sealed this

Twenty-ninth Day of December, 1992

Attest:

DOUGLAS B. COMER

*Attesting Officer*     *Acting Commissioner of Patents and Trademarks*